J. B. WHITTAKER.
BICYCLE.
APPLICATION FILED FEB. 23, 1917.

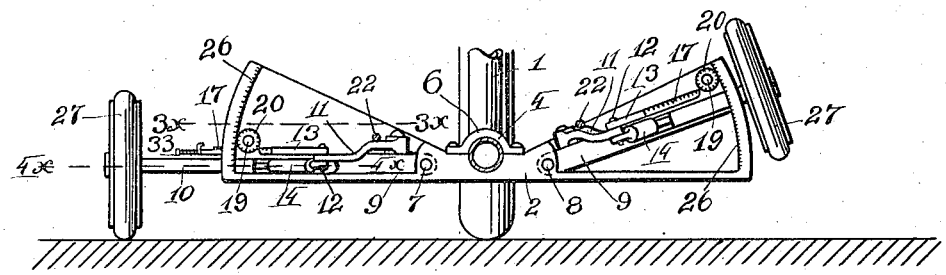
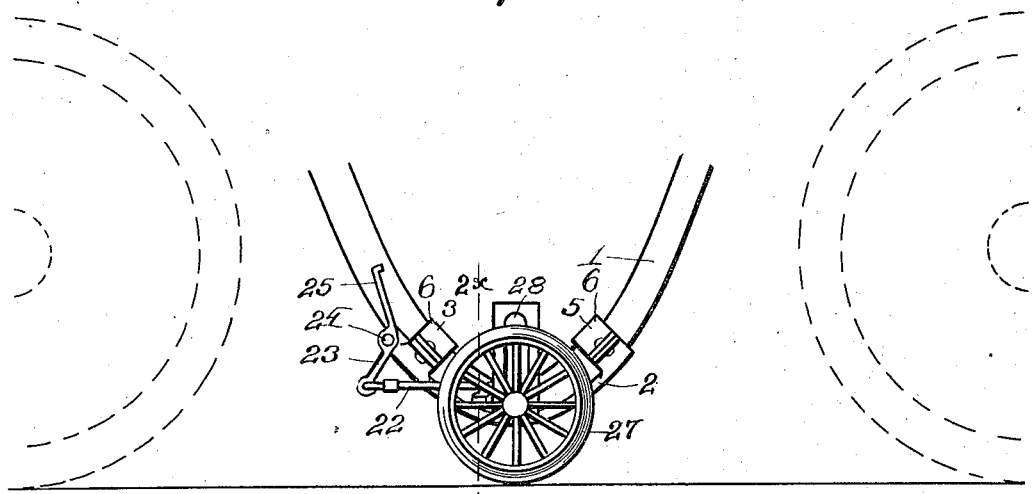
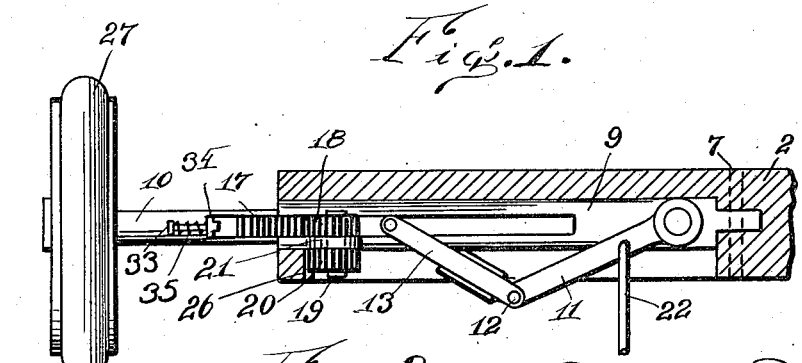

1,250,740.

Patented Dec. 18, 1917.
2 SHEETS—SHEET 2.

Witness
Eric Schinger

Inventor
James B. Whittaker
By Frank Keifer
Attorney

UNITED STATES PATENT OFFICE.

JAMES B. WHITTAKER, OF ROCHESTER, NEW YORK.

BICYCLE.

1,250,740.  Specification of Letters Patent.  Patented Dec. 18, 1917.

Application filed February 23, 1917. Serial No. 150,549.

*To all whom it may concern:*

Be it known that I, JAMES B. WHITTAKER, a citizen of the United States of America, residing at 6 Rodenbeck Place, Rochester, N. Y., in the county of Monroe and State of New York, have invented certain new and useful Improvements in Bicycles, of which the following is a specification.

The object of this invention is to provide an attachment for bicycles or motorcycles which will act as a lateral support therefor.

This and other objects of the invention will be fully illustrated in the drawings, described in the specification and pointed out in the claims at the end thereof.

In the drawings,

Figure 1 is a side elevation of a portion of a motorcycle frame showing my attachment applied thereto.

Fig. 2 is a section on the line 2×—2× of Fig. 1.

Fig. 3 is a section on the line 3×—3× of Fig. 2.

In the drawings like reference numerals indicate like parts.

In the drawings,

Figure 4:
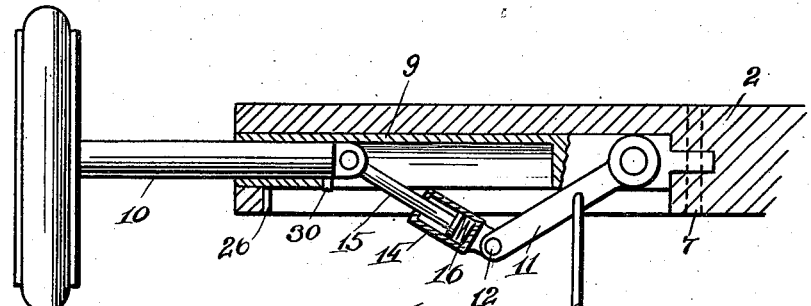
Fig. 4 is a section on the line 4×—4× of Fig. 2.

Reference numeral 1 indicates the frame of a motorcycle to which the attachment is clamped.

Reference numeral 2 indicates the frame of the attachment which is provided with the sockets or bearings 3, 4 and 5. Each of these sockets is formed with its lower half integral with the frame 2 and the upper half in a cover plate 6 which is removable and is clamped down on the frame 2 by bolts.

The frame of the attachment is fastened to the frame of the motorcycle by first removing the cover plates and then fitting the sockets in the frame of the attachment to the bars that make up the lower frame of the motor-cycle so that they embrace the bars, after which the cover plates are fastened in place so that the bars of the motor-cycle frame are securely clamped between the cover plates and the frame of the attachment by which the attachment will be firmly held in place.

The frame 2 extends transversely to the frame of the motor-cycle. Each end of the frame 2 extends upwardly and has the shape of a segment. On either side of the center of the frame 2 are provided the horizontal pins 7 and 8 on which swing the mechanism for supporting the wheels of the attachment and raising and lowering these wheels and moving them in and out.

Each of these supports consists of a sleeve 9 in which the spindle 10 can move in and out. The sleeves are placed on the opposite sides of the frame of the attachment and are alike except that the one is symmetrically reversed from the other from right to left. Each sleeve extends through the slots 28 in its end of the frame, by which slot its up and down movement is limited. Pivoted on the top of the sleeve is the link 11 on the outer end of which is carried a pin 12. Pivotally mounted on this pin above the link 11 is the link 13 and below the link 11 is the link 14. The link 14 is hollow and a stem 15 is pivotally mounted on the end of the spindle 10 and passes into the link 14. The end of the stem 15 compresses a spring 16 by the expansion of which the link 14 and the stem 15 are held in proper relation to each other. The link 13 is connected to the rack 17 mounted to slide on the sleeve 9. This rack engages with the pinion 18 mounted on the pin 19 which pin carries at its opposite end the pinion 20. The pinions 20 and 18 are keyed on the pin 19. The pin 19 is mounted to rotate in a lug 21 formed on the sleeve 9, the pinions 18 and 20 being placed on the opposite sides of the lug 21.

Connected to the link 11 is the link 22 which in turn is connected to the lever 23 mounted on the shaft 24 carried on the frame 2 on the upper end of which lever is formed a pedal 25. When the pedal 25 is pushed to the left in Fig. 1 the link 22 will be pushed to the right, straightening the toggle composed of the link 11 on one side of the pin 12 and the links 13 and 14 on the other side of the pin 12, the toggle is moved to the positions shown in Figs. 3 and 4. As the toggle moves to the position shown in Figs. 3 and 4 the rack 17 will move to the right in Fig. 5 and this in turn will cause the rotation of the pinions 18 and 20. The pinion 20 engages with the segmental rack 26 and as it rotates it will travel downwardly along the rack and carry with it the sleeve 9 causing it to swing around the center 7. The downward movement of the sleeve will continue carrying with it the wheel 27 until the sleeve reaches the lower end of the slot 28 through which it extends to the end of the frame 2 and rests on the bottom of the frame in which position the wheel 27 will rest on the ground.

As the wheel moves down it is at the same time pushed out, this result being secured by the link 14 shown in Fig. 4 which link is connected to the spindle 10 on which the wheel is carried.

On the spindle 10 is provided a pin 30 which engages with the sleeve 9 and stops the outward movement of the wheel, before the toggles 11 and 14 have reached the position shown in Fig. 4 and before the sleeve and pinions have finished their downward movement, after which the further movement of the links 11 and 14 will merely compress the spring 16.

Figure 6:
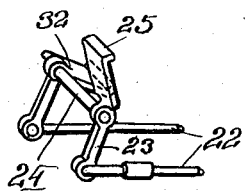
Fig. 6 is a perspective view of the pedals for operating the mechanism.

As shown in Fig. 6 the pedal is connected to two rods 22 which connect to the links 11 on both sides of the frame by which they are operated simultaneously. A pedal 32 is provided on the opposite end of the shaft 24 by which it may be rocked in the opposite direction to raise the wheels and draw them in.

Figure 5:
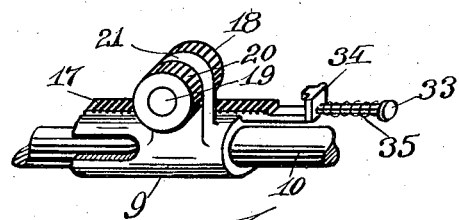
Fig. 5 is a perspective view of a bracket which supports the pinion which engages the rack for elevating the wheel.

The end of the rack 17 is mutilated as shown in Fig. 5. On the end is mounted the stationary pin 33. On this pin is mounted to slide the dog 34 which is pressed inwardly by the spring 35. As the rack moves to the left in Fig. 5 it disengages itself from the pinion 18 after which the dog 34 engages the pinion 18 and locks it against turning. Through the pinion 20 the sleeve and wheel have been lifted and by the engagement of the dogs 34 with the pinions 18, both of the sleeves are locked in elevated position.

By the use of this attachment the wheel can be held in an upright position when it is being run either at very low speed or when it has come to rest.

I claim:

1. An attachment for a bicycle having a frame capable of being fastened to a bicycle frame at right angles thereto and projecting outwardly therefrom, a sleeve mounted to swing on said frame, a spindle mounted to slide in said sleeve, a wheel carried on the outer end of said spindle, means for positively swinging said sleeve up and down to raise the wheel thereon from the ground or hold it down in contact with the ground, means for drawing said wheel in as it is raised and for moving it out as it is lowered.

2. An attachment for a bicycle having a frame capable of being fastened to a bicycle frame at right angles thereto and projecting outwardly therefrom, a sleeve mounted to swing on said frame, a link pivoted on said sleeve, a second link having its inner end connected to the free end of the first named link and having the outer end mounted to travel in said sleeve, and a spindle mounted to slide in said sleeve and connected to said link, a wheel on the outer end of said spindle.

3. An attachment for a bicycle having a frame capable of being fastened to a bicycle frame at right angles thereto and projecting outwardly therefrom, a sleeve mounted to swing on said frame, a link pivoted on said sleeve, a second link having its inner end connected to the free end of the first named link and having the outer end mounted to travel in said sleeve, and a spindle mounted to slide in said sleeve and connected to said link, a wheel on the outer end of said spindle, a pedal mounted on said frame, a link connecting said pedal to said first named link.

4. An attachment for a bicycle having a frame capable of being fastened to a bicycle frame at right angles thereto and projecting outwardly therefrom, a sleeve mounted to swing on said frame, a spindle mounted to slide in said sleeve, a wheel carried on the end of said spindle, a link pivoted on said sleeve, a second link having its inner end connected to the free end of the first named link and having its outer end mounted to travel in said sleeve and connected to said spindle, a rack mounted to travel on said sleeve, a third link having its inner end connected to the free end of said first named link and having its outer end connected to said rack, a pinion mounted on said sleeve, said pinion being adapted to mesh with said rack, a stationary rack on said frame with which said pinion meshes, said pinion serving to raise and lower said sleeve as said first named rack moves in and out.

5. An attachment for a bicycle having a frame capable of being fastened to a bicycle frame at right angles thereto and projecting outwardly therefrom, a sleeve mounted to swing on said frame, a spindle mounted to slide in said sleeve, a wheel carried on the end of said spindle, a link pivoted on said sleeve, a second link having its inner end connected to the free end of the first named link and having its outer end mounted to travel in said sleeve and connected to said spindle, a rack mounted to travel on said sleeve, a third link having its inner end connected to the free end of said first named link and having its outer end connected to said rack, a pinion mounted on said sleeve, said pinion being adapted to mesh with said rack, a stationary rack on said frame with which said pinion meshes, said pinion serving to raise and lower said sleeve as said first named rack moves in and out, means for locking said pinion to the stationary rack when it is in its raised position.

6. An attachment for a bicycle comprising a frame capable of being fastened to a bicycle frame and at right angles thereto and projecting outwardly therefrom, a sleeve mounted to swing on said frame, a spindle mounted to slide in said sleeve, toggle levers mounted on said sleeve and connected to said spindle, a rack mounted to slide on top of said sleeve, said rack being independently connected to said toggle levers, a pair of pinions mounted to rotate on the end of said sleeve, said sliding rack being adapted to mesh with one of said pinions, a mutilated portion on the end of said rack, a spring pressed dog mounted on the end of said mutilated portion of said rack, said dog being adapted to engage said pinion and prevent it from rotating when located over said mutilated portion of said rack, a stationary segmental rack provided on said frame and meshing with the other of said pinions, said segmental rack being adapted to raise, lower or hold said sleeve in a stationary position during the forward and rearward movement of said sliding rack when operated by said toggle levers.

In testimony whereof I affix my signature in presence of a witness.

JAMES B. WHITTAKER.

Witness:
ELEANOR M. CORCORAN.

Copies of this patent may be obtained for five cents each, by addressing the "Commissioner of Patents, Washington, D. C."